Figure 1:
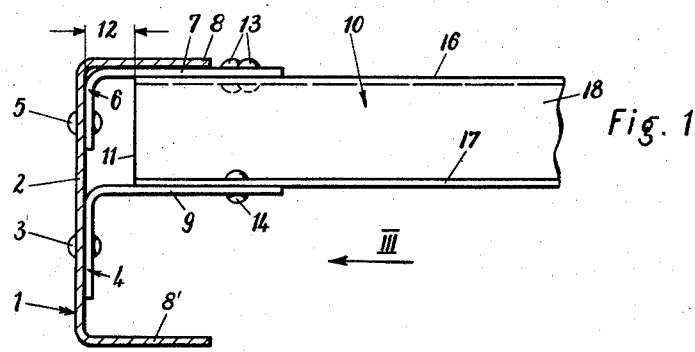

July 15, 1958  H. F. W. MARUHN  2,843,231
GIRDER CONNECTION FOR VEHICLE FRAMES
Filed March 22, 1955

INVENTOR
HERBERT F. W. MARUHN

BY  Dicke and Craig
ATTORNEYS.

United States Patent Office 2,843,231
Patented July 15, 1958

2,843,231

GIRDER CONNECTION FOR VEHICLE FRAMES

Herbert F. W. Maruhn, Stuttgart-Uhlbach, Germany, assignor to Daimler-Benz Aktiengesellschaft, Stuttgart-Unterturkheim, Germany Application March 22, 1955, Serial No. 496,012

Claims priority, application Germany March 31, 1954

5 Claims. (Cl. 189—36)

This invention relates to a vehicle frame and more particularly to a frame adapted for use in motor vehicles which consists of both longitudinal and cross girders or bearer members.

An object of the present invention is to provide an improved construction for connecting the girders with one another which is exceedingly strong but nevertheless permits elastic deformation of the vehicle frame.

A further object of the present invention is to provide a connection of the type referred to which is of simple sturdy construction and wherein each of the parts is simple in form and easily manufactured.

An important feature of the present invention accordingly consists in a construction wherein one girder or bearer member is connected with the other girder or bearer member only by intermediate members in the form of angle irons and preferably in such a manner that one leg of one girder permits vertical yielding of the other girder, by yielding of the intermediate members, only in downward direction but not in upward direction, in that, for example, one leg of one of said intermediate members is in abutting engagement with one flange, preferably the upper flange of a longitudinal girder. By most simple means is thus attained an irreproachable as well as flexible connection of the frame cross members with the longitudinal members of an automobile frame which in addition affords stiffening of the longitudinal member and its upper flange respectively without impairment to the aforesaid connection.

A further feature of the present invention consists in a construction in which the intermediate angle irons, especially the particular angle iron whose leg is in abutting engagement with the flange of the longitudinal girder, are arranged within a longitudinal girder zone where a body section, for example, the platform terminates with its support on the longitudinal member.

According to a still further feature of the present invention at least one of the intermediate angle members is wider than the others. In addition, the ends of the legs of these members are cut at an angle to the longitudinal direction of the longitudinal frame members, more particularly at an angle of less than 45 degrees so as to effect that stresses which may occur therein are appropriately distributed.

Figure 2:
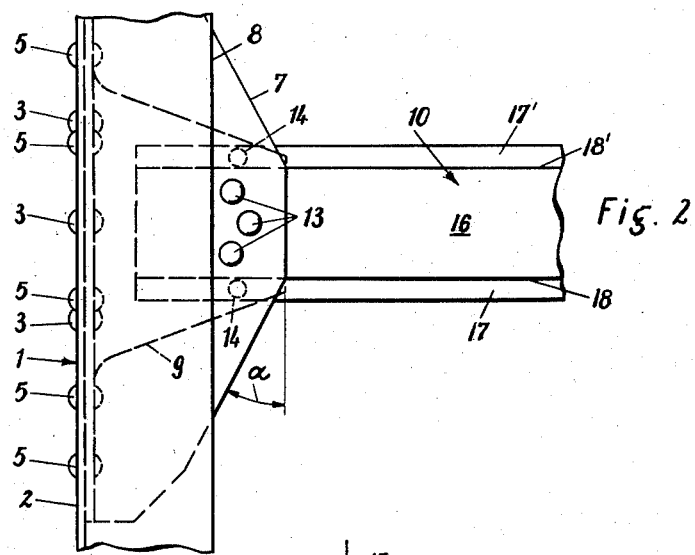
Figure 3:
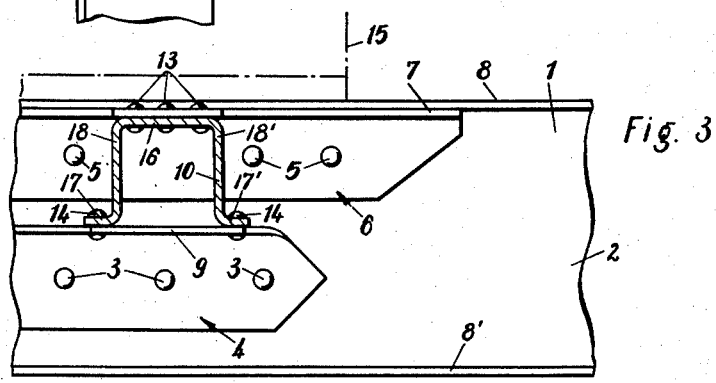

Other objects and features of the invention will become apparent from the following description and appended claims taken in connection with the accompanying drawings which illustrate one embodiment of the invention. In the drawings:

Fig. 1 is a section through a longitudinal girder of an automobile frame, showing also the frame joint formed with one cross member in elevation, Fig. 2 is a top plane view of the frame joint shown in Fig. 1, and Fig. 3 is a view in the direction of arrow III according to Fig. 1.

It will be obvious that various modifications may be made in the embodiment above described without in any way departing from the spirit of the invention as defined in the appended claims.

In different figures of the drawing, wherein like reference numerals are used to designate like parts, reference numeral 1 designates a longitudinal girder or bearer member of a vehicle frame having three leg portions disposed essentially at right angles with respect to each other consisting of a relatively large web portion 2 and two shorter flange portions 8 and 8' thereby constituting a relatively wide-web U-section.

One leg portion each of intermediate members or angle irons 4 and 6 is riveted by means of rivets 3 and 5, respectively, to the inside of web portion 2. The other leg portion 7 of angle iron 6 extends beyond the flange portion 8 of the longitudinal girder or bearer member 1 and is in abutting engagement with the inside thereof. A hat-shaped cross girder or bearer member 10 having a top section 16, two rim sections 17 and 17' essentially parallel to the top section 16 and two parallel side sections 18 and 18' essentially at right angles to and connecting said top section with said rim sections is so arranged between the leg portion 7 of the angle iron 6 and the leg portion 9 of the angle iron 4 that a gap or spacing 12 is formed between the end 11 of the cross girder or bearer member 10 and the web portion 2 of the longitudinal girder or bearer member 1, i. e., the cross girder or bearer member 10 terminates at a distance 12 from the web portion 2 of longitudinal girder member 1. The cross girder or bearer member 10 is riveted by means of rivets 13 to the leg portion 7 of angle iron 6 and by means of rivets 14 to the leg portion 9 of angle iron 4.

As clearly shown in Figures 2 and 3, the angle iron or intermediate member 6, whose leg portion abuts against the inside of the flange portion 8 of the longitudinal bearer member 1 of the vehicle frame, extends a greater distance underneath the flange 8 than the leg portion 9 of intermediate member 4 so that the angle iron 6 supports the flange portion 8 effectively in absorbing stresses originating from the body sections 15, for example, from a body platform terminating within the range of this frame joint. In order to distribute the stresses favorably, the leg portion 7 of the angle iron 6 is additionally cut at an angle $\alpha$ which amounts to less than 45° with respect to the central longitudinal plane of the vehicle frame.

It will be obvious that various modifications may be made in the embodiment above described without in any way departing from the spirit of the invention as defined in the appended claims.

What I claim is:

1. A frame construction for motor vehicles which is very strong yet enables relative elastic deformation of the various parts thereof comprising a longitudinal girder member having at least two leg portions extending at an angle to each other, one of said two leg portions being relatively longer and the other of said two leg portions being relatively shorter, a cross girder member extending at an angle with respect to said longitudinal girder member and terminating at a distance from said relatively longer leg portion, said cross girder member being provided with at least two sections forming connecting surfaces, said sections being substantially parallel to said relatively shorter leg portion and spaced at different distances therefrom, a first and a second intermediate member in the form of angle irons each having a first leg portion substantially parallel to said relatively longer leg portion and a second leg portion essentially parallel to said connecting surfaces, both of said intermediate members being connected with the first leg portions thereof to said relatively longer leg portion of said longitudinal girder member and with the second leg portions to respective ones of said connecting surfaces of said cross girder member to thereby provide a strong connection between said girder members yet permit slight yielding of said cross girder in the direction of said relatively longer leg portion.

2. A frame construction according to claim 1, wherein said cross girder member is of essentially hat-shaped cross section having a top section, two parallel rim sections essentially parallel to said top section, and two side sections connecting said top section with a respective rim section, said top section and said rim sections thereby constituting said connecting surfaces.

3. A frame construction according to claim 1, wherein said intermediate members are disposed above one another with the second leg portion of the upper intermediate member abutting against said relatively shorter leg portion.

4. A frame construction according to claim 3, wherein said last-mentioned second leg portion extends beyond said relatively shorter leg portion of said longitudinal girder member in the direction of said cross girder member.

5. A frame construction according to claim 4, wherein said last-mentioned second leg portion of said upper intermediate member is wider at the base thereof than said cross girder member and is tapered longitudinally toward the free end thereof to improve stress distribution therein.

References Cited in the file of this patent

UNITED STATES PATENTS 986,422    Bettendorf _____ Mar. 7, 1911

FOREIGN PATENTS 646,398    Germany _____ June 12, 1937